United States Patent
Boyle et al.

(10) Patent No.: US 12,088,474 B2
(45) Date of Patent: Sep. 10, 2024

(54) PREDICTIVE SCORING BASED ON KEY PERFORMANCE INDICATORS IN TELECOMMUNICATIONS SYSTEM

(71) Applicant: Ribbon Communications Operating Company, Inc., Westford, MA (US)

(72) Inventors: Charles W. Boyle, Upton, MA (US); Surya Kumar Kovvali, Plano, TX (US); Nizar K. Purayil, Bangalore (IN)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 0 days.

(21) Appl. No.: 16/962,802

(22) PCT Filed: Jul. 12, 2019

(86) PCT No.: PCT/US2019/041537
§ 371 (c)(1),
(2) Date: Jul. 16, 2020

(87) PCT Pub. No.: WO2020/014569
PCT Pub. Date: Jan. 16, 2020

(65) Prior Publication Data
US 2022/0006704 A1  Jan. 6, 2022

Related U.S. Application Data

(60) Provisional application No. 62/763,969, filed on Jul. 12, 2018.

(51) Int. Cl.
*H04L 41/16* (2022.01)
*G06F 16/907* (2019.01)
(Continued)

(52) U.S. Cl.
CPC ............ *H04L 41/16* (2013.01); *G06F 16/907* (2019.01); *G06F 18/2148* (2023.01);
(Continued)

(58) Field of Classification Search
CPC ........................... H04L 41/0631; H04L 41/16
See application file for complete search history.

(56) References Cited

U.S. PATENT DOCUMENTS 8,565,076 B2  10/2013  Kovvali et al.
8,732,170 B2   5/2014  Kalavade
(Continued)

FOREIGN PATENT DOCUMENTS

EP   3197097 A1   7/2017
EP   3342146 A1   7/2018
(Continued)

OTHER PUBLICATIONS

International Searching Authority, PCT Notification of Transmittal of the International Search Report and the Written Opinion of the International Searching Authority, or the Declaration mailed Oct. 9, 2019, for International Appl. No. PCT/US2019/041537, 8 pages, Alexandria, VA.

(Continued)

*Primary Examiner* — Philip C Lee
(74) *Attorney, Agent, or Firm* — HAYNES AND BOONE, LLP

(57) ABSTRACT

A method includes: receiving protocol event data from a plurality of probes within the telecommunication system; determining a most probable cause of a call event from the protocol event data; applying the most probable cause to a trained machine learning algorithm that includes the most probable cause as its input and a telecommunication system score as its output; and in response to an output score from the trained machine learning algorithm, performing a cor- (Continued)

rective action for a plurality of network users that are expected to be affected by the most probable cause.

19 Claims, 6 Drawing Sheets

(51) Int. Cl.
| | |
|---|---|
| G06F 18/214 | (2023.01) |
| G06F 18/23 | (2023.01) |
| G06F 18/2415 | (2023.01) |
| G06N 3/08 | (2023.01) |
| G06N 5/04 | (2023.01) |
| G06Q 10/0639 | (2023.01) |
| H04L 41/0631 | (2022.01) |
| H04L 41/5009 | (2022.01) |
| H04L 43/0817 | (2022.01) |
| H04L 43/0823 | (2022.01) |
| H04L 65/1073 | (2022.01) |
| H04L 65/1104 | (2022.01) |
| H04L 65/65 | (2022.01) |
| H04M 3/51 | (2006.01) |
| H04W 24/02 | (2009.01) |
| H04W 24/04 | (2009.01) |
| H04W 24/08 | (2009.01) |
| H04W 24/10 | (2009.01) |

(52) U.S. Cl.
CPC ........ *G06F 18/23* (2023.01); *G06F 18/24155* (2023.01); *G06N 3/08* (2013.01); *G06N 5/04* (2013.01); *G06Q 10/06393* (2013.01); *H04L 41/0631* (2013.01); *H04L 41/5009* (2013.01); *H04L 43/0817* (2013.01); *H04L 43/0823* (2013.01); *H04L 65/1073* (2013.01); *H04L 65/1104* (2022.05); *H04L 65/65* (2022.05); *H04M 3/5175* (2013.01); *H04W 24/02* (2013.01); *H04W 24/04* (2013.01); *H04W 24/08* (2013.01); *H04W 24/10* (2013.01)

(56) References Cited

U.S. PATENT DOCUMENTS

| | | | |
|---|---|---|---|
| 8,755,297 B2 | 6/2014 | Kalavade | |
| 8,817,614 B1 * | 8/2014 | Ben-Nun | H04W 24/08 370/428 |
| 8,908,507 B2 | 12/2014 | Kovvali et al. | |
| 9,204,329 B2 | 12/2015 | Boyle et al. | |
| 9,204,474 B2 | 12/2015 | Kovvali et al. | |
| 9,414,248 B2 | 8/2016 | Kovvali et al. | |
| 10,296,848 B1 * | 5/2019 | Mars | G06N 20/20 |
| 2014/0122594 A1 * | 5/2014 | Uzunalioglu | H04L 41/5067 709/204 |
| 2014/0153418 A1 * | 6/2014 | Hariharan | H04W 24/10 370/252 |
| 2016/0021173 A1 * | 1/2016 | Tapia | H04W 72/04 709/204 |
| 2016/0036972 A1 * | 2/2016 | Ristock | H04M 3/5175 379/266.1 |
| 2016/0094721 A1 * | 3/2016 | Tapia | H04M 15/8016 455/406 |
| 2016/0162346 A1 * | 6/2016 | Kushnir | G06F 11/079 714/37 |
| 2016/0344606 A1 * | 11/2016 | Baccarani | H04L 41/5067 |
| 2016/0371712 A1 * | 12/2016 | Niemoeller | H04L 41/5067 |
| 2019/0043068 A1 * | 2/2019 | Livne | G06Q 30/0205 |
| 2021/0051183 A1 * | 2/2021 | Komaromi | H04M 7/0093 |

FOREIGN PATENT DOCUMENTS

| | | | | |
|---|---|---|---|---|
| EP | 3342146 B1 | 3/2021 | | |
| WO | WO-2011139639 A1 * | 11/2011 | ............ | H04L 41/06 |
| WO | WO-2013075487 A1 * | 5/2013 | ............ | H04W 24/08 |
| WO | WO 2017/037598 A1 | 3/2017 | | |

OTHER PUBLICATIONS

European Patent Office, Communication—European Search Report dated Mar. 9, 2022 for Application No. 19833131.6, 8 pages, Munich Germany.

European Patent Office, Communication—European Search Report dated Mar. 11, 2022 for Application No. 19834934.2, 8 pages, Munich Germany.

European Patent Office, Communication—European Search Report dated Mar. 11, 2022 for Application No. 19834784.1, 8 pages, Munich Germany.

European Patent Office, Communication—European Search Report dated Mar. 1, 2022 for Application No. 19834933.4, 9 pages, Munich Germany.

* cited by examiner

PREDICTIVE SCORING BASED ON KEY PERFORMANCE INDICATORS IN TELECOMMUNICATIONS SYSTEM

PRIORITY INFORMATION

This application is a U.S. National Stage patent application of International Patent Application No. PCT/US2019/041537 filed on Jul. 12, 2019, which claims the benefit of U.S. Provisional Patent No. 62/763,969 filed Jul. 12, 2018 and entitled "A Method for Automatically Classifying Network Performance and Degradation and Corrective Action Given Network Data Events and Key Performance Indicators," the disclosures of which are hereby incorporated by reference in their entirety.

BACKGROUND

Network service providers such as mobile operators, cable operators or Internet service providers spend a disproportionate amount of time and money operating the network as compared to the original cost of network roll-out. This stems from the complex relationship of layered, multi-vendor network elements, geographically disperse communication, mesh of interconnectivity to handle capacity and failures, as well as the historical nature of the services which require backwards compatibility with the end-users (e.g. service subscribers). A critical component in maintaining these networks is the software that delivers core operational functions such as performance monitoring, and fault management ultimately contributing to the analysis and resolution. Despite constant monitoring, updating, and fixing, no network is perfect, and it is expected that some users will experience a dropped call, slow data, or other less than optimal network event.

Operators and businesses collect user feedback after customer service calls by sending out online or hard copy surveys. One example includes a text message sent to a network user that asked the network user to provide a "would recommend" or "would not recommend" indication of the network user's experience. Another example includes an online survey that may be more finely-grained, such as asking a user to rate network service on a scale of 1 to 10. Some operators and businesses solicit feedback on the use of services via periodic surveys from important customers (VIPs). Network operators typically use such surveys to retain existing customers and to be apprised of network problems. Such surveys can be time consuming, expensive, and many customers may not complete them. Thus, there is a desire in the art to have better techniques to score telecommunications network service.

BRIEF DESCRIPTION OF THE DRAWINGS

The present disclosure is best understood from the following detailed description when read with the accompanying figures.

DETAILED DESCRIPTION

Figure 1:
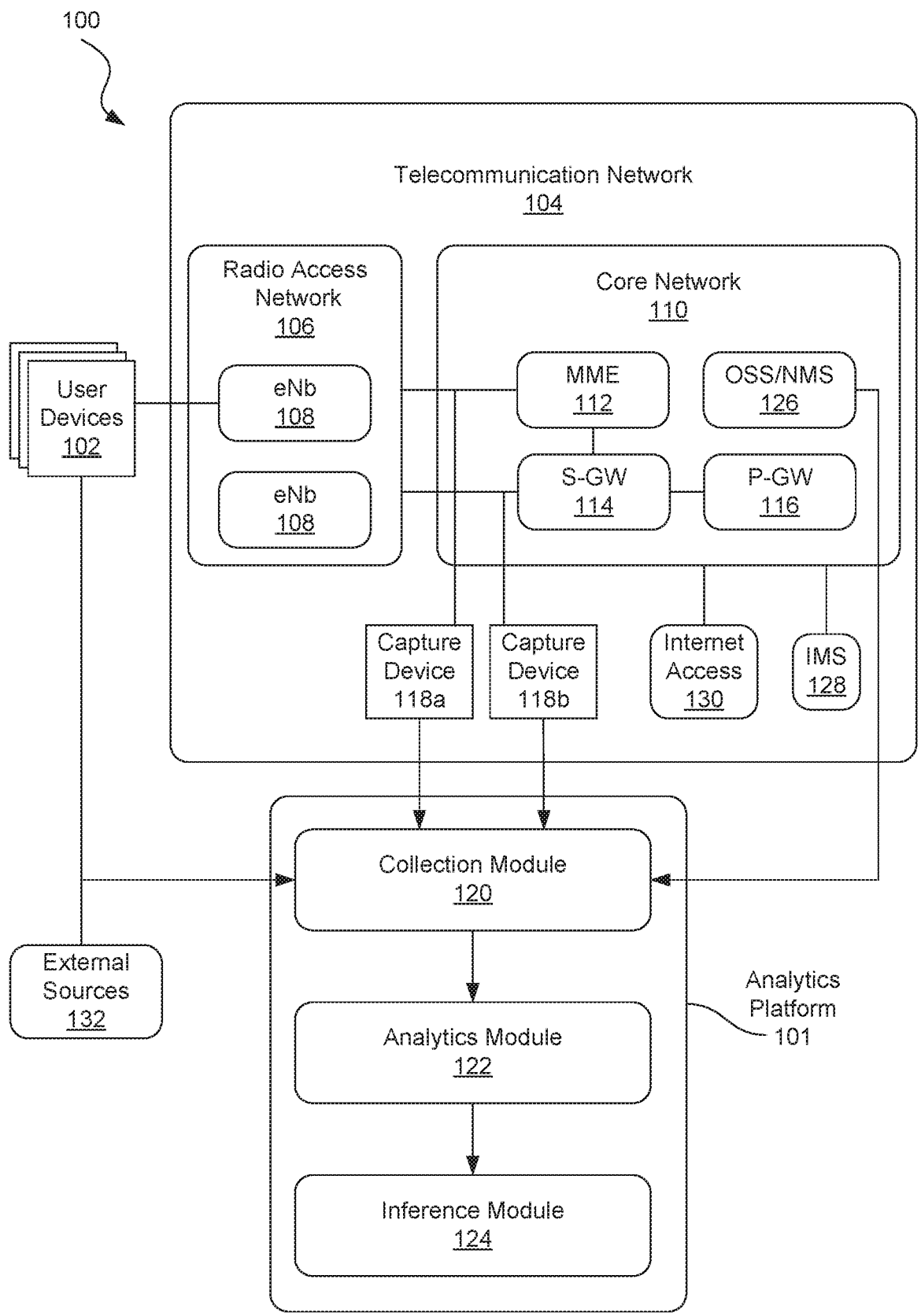
FIG. 1 is a diagram showing an illustrative environment in which the most probable cause for a KPI may be determined, according to one example of principles described herein.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include estimating a score for a telecommunications network, such as a Net Promoter Score (NPS), based on the user and service Key Performance Indicators (KPIs) computed from network data. An example embodiment uses the survey data that contains subscriber information, associated services, and customer rated NPS scores as labelled data and filters network and operator data for the same set of subscribers, computes the user and service KPIs from the network data (e.g., determines the most probable cause for a negative KPI for a call), to train supervised learning models. In addition, since the KPIs may be metrics derived from cause/failure codes, or observed behavior such as mobility, handovers, or inter-working between multiple technologies of underlying protocols, survey results may be mapped to the underlying protocol behavior. The models facilitate estimating NPS scores for large numbers of users, their services, and their interactions with customer support team without requiring sending online or hardcopy surveys. The model training could be periodically retuned by using smaller sets of actual surveys or when new services are offered or updated. Additionally, the NPS score facilitates offering new value-added services, and targeting promos.

While bad call performance generally makes a user unhappy, the user's tolerance level and acceptance of call problems are dependent on a number of criteria, such as, (a) frequency of problems in a short time period (hour, day, week etc.), (b) duration of call, (c) mobility, (d) outdoor/indoor environment, time of day, (f) situation when the call is made (for example from airport, concert/stadium etc. Thus, mapping KPI attributes to survey feedback using supervised learning models may facilitate improved statistical characterization.

In one example, a call with a negative KPI is analyzed to determine a most probable cause of failure. For instance, a faulty eNodeB may be causing radio failures, as experienced by the particular call. The system analyzes the call and determines that the faulty eNodeB is the most probable cause of the failure. The system includes previously-trained machine learning algorithms that take network failure causes as input and generate NPS scores as output. Continuing with the example, the system may input the faulty eNodeB cause into the machine learning algorithm to receive a predicted NPS score. The network operator may then take appropriate action, such as by providing a courtesy call to the affected network user, providing the affected network user with complementary data, or the like.

Additionally, the system includes a database that links network user identities to the particular calls, and each of the calls may be linked to particular user equipment (UE), eNodeBs, and other network equipment. Thus, in an example in which the most probable cause is a faulty eNodeB, the network operator may search call records to determine which users were also affected by the faulty eNodeB and then proactively reach out to those users and take appropriate action.

Of course, faulty eNodeB is just one example of a most probable cause of a network failure. Other examples include a particular handset model in a geographical area that may have trouble registering with the network, operating system issues on UE, damaged infrastructure such as cables and antennas, and the like.

FIG. 1 is a diagram showing an illustrative environment 100 in which classification of telecommunication event objects may be performed. According to the present example, the environment includes a telecommunication network 104 that establishes communication sessions between devices 102. In the present example, the telecommunication network 104 is a Long Term Evolution (LTE) network, which may be used to provide VoLTE services. However, the principles described herein may be applied to other types of networks, such as 3G networks, 5G networks, cable networks, and the like.

In short, the telecommunication network 104 may include various capture devices 118a, 118b that collect information from network events, such as communication sessions or calls. That captured information is then provided to a collection module 120. The collection module 120 includes hardware and/or logic for taking the information captured by the capture devices 118a, 118b and putting it into a particular data structure. Such data structure will be referred to as an event object. The event objects created by the collection module 108 are then provided to the analytics module 122 for classification. The classified event objects are then provided to the inference module 124 to infer relationships between input parameters (e.g., device, region, protocol) and output parameters (KPIs).

In this example, an event object contains information from multiple protocols (for example, SIP, RTP, S11-MME etc.), for a VoLE Call (Voice over LTE call). Since a specific attribute such as international mobile subscriber identity (IMSI) and CallID may not be present in every protocol involved in that call, various embodiments identify common attributes across two or more protocols. For example, Voice Call identifier is present in SIP Protocol, and not present in RTP, S11-MME Protocols. Similarly IMSI identifier is present in S11-MME but not present in SIP, RTP etc. Since S11-MME protocol contains user plane tunnel establishment procedure, and contains user plane tunnel identifiers, that are also present in S1U User Plane Tunnels that carry SIP, RTP traffic, tunnels-ID are used to correlate between S11-MME & S1U User Plane that carries SIP and RTP protocol packets. Thus, IMSI in the event object that call attributes is determined by correlating between S11-MME and S1U protocol data. Similarly, CallID is populated by correlating SIP data with SDP and RTP protocols. The protocol flows of multiple protocols may be correlated pairwise by matching common attribute fields, temporal sequence of protocols, for example S1-MME exchange preceded S1-U/SIP traffic, and protocol insights.

In further detail, the telecommunication network 104 includes a radio access network 106 and a core network 110. The radio access network 106 includes the stations (in this case eNodeB's 108) that wirelessly connect to mobile devices, such as the user devices 102. Such wireless devices may be referred to as User Equipment (UEs). The user devices 102 may include any piece of hardware and/or software that is capable of interfacing with the telecommunication network 104. For example, a user device 102 may include a smart phone, a desktop computer, a laptop computer, a tablet computer, or other computing system. The user devices 102 may interface with the telecommunication network using a variety of telecommunication protocols. For example, the user devices 102 may communicate using SIP and Real-time Transfer Protocol (RTP). Other protocols are contemplated.

As mentioned above, while the telecommunication network 104 may be one of a variety of types of networks, the present example is an LTE network that may provide Voice over Long Term Evolution (VoLTE) services. A VoLTE service establishes packet-switched connections between two user devices using the media bearer plane of the LTE standards.

Continuing this example, the telecommunication network 104 may include various pieces of infrastructure. For example, the telecommunication network 104 may also include a core network (Referred to as Evolved Packet Core (EPC)) that includes a Mobility Management Entity (MME) 112, a Service Gateway (S-GW) 114, a Packet Data Network (PDN) Gateway (P-GW) 116, and an Operations Support System (OSS) and a Network Management System (NMS) 126. The core network 110 may provide connection to the Internet through the internet access module 130 and various IP multimedia (IMS) servers 128. In other examples where the telecommunication network is a VoIP network, the infrastructure may include a variety of internet servers.

The MME 112 is a control-node for the LTE access-network. It is responsible for idle mode UE (User Equipment) paging and tagging procedure including retransmissions. The MME 112 is involved in the bearer activation/deactivation process and is also responsible for choosing the SGW for a UE at the initial attach and at time of intra-LTE handover involving Core Network (CN) node relocation. It is responsible for authenticating the user (by interacting with the Home Subscriber Server (HSS)). The MME 112 checks the authorization of the UE to camp on the service provider's Public Land Mobile Network (PLMN) and enforces UE roaming restrictions. The MME 112 handles the security key management. Interception of signaling is also supported by the MME, such as the capturing performed by capture device 118a. In some examples, the signaling traffic exchange with the MME may be mirrored by the MME or mirrored by a transit network device such as a router or tapped by optical tap, and fed to the capturing device 118a.

The SGW 114 routes and forwards user data packets, while also acting as the mobility anchor for the user plane during inter-eNodeB handovers and as the anchor for mobility between LTE and other 3GPP technologies. The SGW 114 manages and stores UE contexts, e.g. parameters of the IP bearer service, network internal routing information. It also performs replication of the user traffic for interception.

The PGW 116 provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening. Another role of the PGW is to act as the anchor for mobility between 3GPP and non-3GPP technologies.

The capture devices 118 may include various probes that collect the data being transmitted to either the MME or the SGW. For instance, probes may replicate data packets and send those replicated data packets to the analytics platform 101. The capture devices 118 may include, for example, a Data Capture Engine (DCE) and a Network Data Processor (NDP). The DCE may capture the relevant data and the NDP may process that data. The NDP may then pass the data to the analytics platform 101, and more particularly, the collection module 120 of the analytics platform 101. In some examples, the collection module 120 instructs the capture devices 118a, 118b to collect specific types of data. For example, the collection module 120 may detect a negative event such as a dropped call, or a threshold number of dropped calls, and request that the capture device provide specific pieces of information.

The data capturing devices 118a, 118b (Optical TAP, port mirror, DCE etc.), may have intermittent packet losses, due to network/memory/CPU load or due to race conditions in protocol processing. For example, if a tunnel deletion event from S 11 is processed by the DCE before all the data corresponding to that tunnel, the tunnel may be marked as deleted and the remaining data of that tunnel may not be processed correctly. Because the DCE is acting on a copy of the packets, while the end-systems processes correctly, DCE interpretation may be inaccurate in some cases. These cases are accommodated by multi-protocol correlated view of a call, rather than depending on a specific protocol; for example, if 200OK response is missing for an INVITE transaction, but there is bidirectional RTP data for a time greater than a configured period, and bidirectional data is greater than configured value, the call could be considered as successful. Similarly, if INVITE transaction is missing, and 200OK (INVITE) is received the Analytic system per the current technique considers the call as successful.

In some examples, the capture devices only record data for a preset period of time in the past. For example, the capture devices 118a, 118b may collect event data for the past hour and store it in a First In First Out (FIFO) buffer. Thus, any new data coming in overwrites the oldest data. If the capture devices 118a, 118b receive a request from the collection module for certain data, then the data in the buffer may be sent to the collection module 120.

The collection module 120 includes the hardware and/or software to receive data from the capture devices and create a data structure that stores various pieces of information about a particular event (e.g., call). The collection module 120 may receive data from other sources such as the user devices 102, the OSS/NMS 126, and other external sources 132 such as blogs of experience or network outage, security threats impact the area associated with user devices (e.g. Apple, Android), applications (e.g. YouTube player), services (e.g. email, voice calls), or Operating Systems/versions (e.g. OSX 13, iOS 10), etc. Such a data structure may be referred to as an event object 301 which comes in several forms such as failed call 202, failed registration 204, etc. and will be discussed in further detail below with the text accompanying FIG. 2. The collection module 120 may include one or more computing systems such as servers.

The collection module 120 may also perform various operations on the data it receives to format it for classification and inference. For example, the collection module may perform a dimensional drill down to identify specific dimensions worth taking a closer look at. Specifically, the collection module 120 may identify the top dimensions for each class of failure or anomaly and suggest focus points for deeper analysis. It groups failures and protocol anomalies (such as interpacket gaps, packet drops, jitter etc.), as major categories and failure types and identifies dominant dimensions for drill-down. For example, the major categories may include repeat calls, dropped calls, one-way calls etc. Protocol KPI based characterization (based on protocol cause codes, observed packet behavior etc.) and failure type are identified. The failure types identified are suggestive of cause of failure, and include device cause, RAN-cause, core network cause, IMS-cause, and the like.

The collection module 120 may also reduce the data into smaller samples. More specifically, the collection module may reduce the data volumes (table rows) in a plurality of tables (for example SIP, RTP, S11, Sv etc., in 3GPP VoLTE deployments) by using the value of dimension attributes (for example, device type=Samsung Galaxy-8), from the alarm/error/warning/Information alerts together with the time-window of the event and reduce the data scope in multiple tables. The data reduction may significantly help service personnel to focus on much smaller datasets near anomaly peaks, in the segments where the anomalies occurred. This also removes bias due to the large normal data and facilitates faster convergence of the inference functions (which will be described in further detail below). Because the percentage of failures in a stable service provider network is very small (<1%), the data reduction is significant. If the data reduction is done in a transit network element before being stored in a data warehouse, the amount of storage may be significantly reduced.

To further reduce the amount of data, extraneous data for successful or non-problematic calls may be removed, while such data is kept for problematic calls. Specifically, for non-problematic calls that follow the normal setup sequence via SIP, and exchange data via RTP without voice/video quality problems, and successfully terminate using SIP/BYE method, the only interesting attributes may be total duration and voice quality (Uplink/Downlink MOS scores). Thus, other data from such event objects may be removed. In some examples, if the Mean Opinion Score (MOS) scores are computed in real-time on the collected RTP/RTCP parameters, MOS scores for the duration of the call may be sufficient for the analytic system. The remaining fine-grained data may be unimportant. However, for problematic calls, fine-grained data from SIP/RTP/RTCP/S11/SV protocols may facilitate root-cause analysis. Thus the data volume reduction may be performed by determining the dominant normal protocol sequences (for example non-problematic call, or un-answered call) and keeping minimal information for such calls.

In a stable VOLTE network most calls are successful and corresponding protocol KPIs are good. Thus, for a large volume of call related events (e.g., 10 Million calls per day) only a small portion (e.g., less than 5%) of such events correspond to calls with bad quality (call drops, failures, media gaps etc.). Furthermore, a small percentage of the bad KPIs are due to a specific eNodeb, a specific device type, or user mobility, etc. However, the 95% of good KPI events dominate the amount of data and strongly bias any statistical algorithms. Filtering out 95% of such data with good KPIs may be inadequate because it may remove the conditions around the anomalies with which to compare data from bad KPIs. Thus, in some examples described herein, the collection module 120 may first select the events with anomalous KPIs, extracting the dimension value of those events (e.g., eNBs, device types, SGWs, APN, QCI etc.), and extract the events for those dimensions from the original large data volume.

For example, if registration failures are high, and the dimensions show, "device types A, B, and eNBs 30, 32, 40, 50, APNs A1, A5," then extracting event data, only when "any of the dimension values match," reduces the amount of data to be analyzed. Feeding the filtered or reduced data to the analytics module 122 and inference module 124 estimates a Problem Diagnosis (PD) by assigning weights to the underlying dimensions. For example, the registration failures could be due to a new vendor device in a particular geographical region of an operator network. This process is repeated for each KPI and the associated anomaly type. The reduced dataset, when fed to the analytics module, facilitates focused visibility to service personnel for additional drill-down and cause analysis.

Additionally, data reduction may include a density-based reduction in which the protocol cause codes (SIP, Q.850, S11, S1-MME, Sv etc.) along with data observations (such as RTP/RTCP media data) such as packet loss, delay, jitter are used to roll-up to a summary Call-KPI (CPI), and the density (%) of each underlying protocol cause is determined, and the top density causes are determined and used to extract information corresponding to the highest density causes. A rules table combines signaling events (SIP cause codes, reason codes, observations from RTP, SRVCC events from Sv interfaces, S11, S1-MME cause codes etc.) for characterizing dropped calls, and the proportion of each cause code to the dropped calls. In one example, it may be determined that 71.17% of dropped calls have inactivity time out after SIP INVITE method. Because the dropped calls are a small proportion of all calls, (for example <5%), filtering out "INVITE+inactivity-timeout", for dropped call analysis from the total dataset is a substantial reduction. The "failure category" in a rules table, as will be described in further detail below, may be determined from the UPLINK/DOWN-LINK of the procedure, call-type (Mobile Terminated/Mobile Originated) and the type of cause; for example, for a mobile terminated call, inactivity timeout after SIP INVITE is sent to the mobile device could be due to radio coverage.

VoLTE/VILTE services involve several underlying control plane and user plane protocols. For example, S1-MME control protocol is used to establish User Plane Tunnels through data-plane (S1U). S11 protocol may be used between the MME 112 and SGW 114. SIP relates to the control plane that runs over the S1U user plane. The RTP data plane carries user data packets using S1U tunnels. Each of these protocol packets are received via the capture devices 118a, 118b (which may include, for example, an optical tap or mirror port) and processed in a compute server node which may be part of the collection module 120. The collection module 120 may also be referred to as a Data Capture Engine (DCE).

Each protocol uses bidirectional packets. For example, SIP traffic flows from the User Device (UE) to the IMS Server, and from the IMS server to the UE. The DCE maps both directions of a flow, for example for a User Call, and creates transactional events, such as INVITE, REGISTER etc. Similarly, the collection module 120 maps each call to a User-IMSI (terminating or originating) based on correlating between user plane tunnel and the control plane (S1-MME or S11) that establishes the user plane tunnel. The events have associated status codes that identify Success, Failure Reasons, Progress indication (for example ringing etc.). When a call is successful, an RTP data path is established between caller and callee to exchange user data packets. Due to network conditions such as poor RF conditions, user data packets may get dropped, creating media gaps.

Using principles described herein, loosely characterized KPIs such as successful calls, failed calls, dropped calls, mute calls are characterized based on a plurality of protocol and data exchanges associated with such calls. Some of these KPIs are derived based on SIP alone, and other are based on RTP, S11, or other protocols in addition to SIP. According to principles described herein, information from multiple protocols such as SIP and RTP transactional procedural steps are used along with several other pieces of information such as underlying transport layer tunnel changes due to mobility for a call based on SIP call-ID, transport tunnel IDs on which the SIP traffic is carried, User IP Address & Port Numbers, and S11 etc.

The collection module 120 may also be able to identify VoLTE-To-VoLTE calls. This may be done by analyzing the SIP protocol packets in both directions (uplink and downlink directions on the S1U interface). Specifically, if both the originating and terminating user devices are in the VoLTE RAN, it may be determined that both are VoLTE. This may be achieved using the following steps: Convert From, To Field to a common format. The treatment is different for From & To; (a) Convert all character to same case; (b) Extract string after SIP: or SIP:+, TEL:, TEL:+ and before @ as "Address (Addr)". The string @xxx may or may not appear after Addr; (c) If Addr starts with a digit (0-9) and it's length=10 digits, and the 1st digit is not a zero, prepend with country code 91; With this all digit fields of addr become 12 digits. In the "TO" field any address such as "*41" etc., remain unchanged; (d) Any non-digit strings in the From/To fields will remain same along with "@xx" string. Only 10 digit fields that do not have '0' as the 1st digit will be prepended with 91; (e) If the "dir="Down", swap "From and To" field. The new fields are names as fr2 and to2; (f) FR2TO2=CONCAT(FR2,TO2) Fpr each FR2TO2 count UP & Down. For each FR2TO2, the minimum count gives the number of Volte to VOLTE Calls for that From/TO Pair.

This method gives only counts but does not identify which call is V-V or not. To identify each call as V-V or not: repeat steps (a)-(f); Sort in FR2TO2, Record Start Timestamp (tr_starts_ts); For each FR2TO2 compute Delta Time from Previous record (same Fr2TO2). If "dir" of previous & current records differ and the delta-time <300 Seconds, then the call is V-V.

The collection module 120 may also mark certain calls as conference calls, multi-party calls, or calls on hold. This may be done by correlating the plurality of control and user planes (QCI 5 and QCI1), SIP & RTP, S11 & S1-MME and further correlating the time boundaries of SIP & RTP sessions of a user. In VOLTE, the SIP and RTP sessions of a user may traverse on the same GTP-U Tunnels (Overt the TOP VOIP), or unique dedicated bearers for improved QOS. For example, SIP uses QCI5 bearer and RTP uses QCI1 bearers. Multi-party calls are identified, by determining additional INVITEs while one call is active, and multiple sources are present in the RTP packets. In multi-party calls where there are more than two participants, data sources in RTP indicate multiple sources in overlapped time intervals. Multi-party calls are differentiated from hold calls by differentiating time overlapped calls with data from one source only in an interval, and SIP cause codes.

The analytics module 122 takes the event objects from the collection module 120 and classifies them based on the information contained within the event objects. This may be done, for example, through use of a rules table. In short, the rules table may include several entries, each entry having a combination of parameters corresponding to data points in the event objects. Each entry may also be associated with one or more KPIs. For example, various combinations of data points from an event object may be associated with a dropped call KPI or a failed registration KPI. Classification mechanisms other than the rules table may be used as well.

The inference module 124 takes the classified event objects and performs various functions to infer relationships from those event objects. For example, in addition to the data points used to classify the event objects, the event objects include several other data points such as type of devices used in the call, geographic location, and other data points that may be used as inputs. The inference module 124 may infer relationships between those inputs and the KPIs associated with those event objects. This may be done, for example, using a machine-learning function.

Machine-learning techniques generally involve comparing input data (e.g., device type, geographic location, network route) with a specified output (e.g., KPI) in order to derive a model that describes the relationship between the input and the output data. As additional data is collected regarding the input and the actual output, the model is updated. Some types of machine-learning techniques are referred to as neural network techniques.

The inference module 124 may selectively choose a mix of event objects that correspond to a desired ratio of "negative" events with corresponding "positive" events. For example, for every event object classified as a failed registration, the inference module may include 10 event objects classified as a successful registration. This ratio may be selected by an administrator to achieve desired results.

The inference module 124 may also perform most probable cause analysis. This is explained in more detail below with respect to FIGS. 2 and 3 inference module 124 uses trained machine learning algorithms to process protocol-level data from calls. The inference module 124 then examines metadata from each of the machine learning algorithms to pinpoint a most probable cause that generates a particular KPI for particular set of inputs. An example most probable cause includes a failing eNodeB or an operating system problem at a UE. Thus, the inference module may provide output to a user that indicates a most probable cause based on applying protocol-level data for a variety of different protocols to trained machine learning algorithms.

Another feature of inference module 124 is that it may also provide predictive scoring (e.g., NPS scoring) for the telecommunications system. The inference module 124 may include other trained machine learning algorithms that receive most probable cause data and output predicted scores, such as predicted NPS scores. Therefore, once the inference module 124 has identified the most probable cause, it can also predict NPS scores. Examples of machine learning algorithms that may be used include those shown in FIG. 3, though any appropriate algorithm may be used.

This example includes two machine learning scenarios—1) determining a most probable cause based on protocol events, and 2) NPS scoring with computed KPIs as inputs, including NPS scores obtained from user surveys as machine learning labels, supervised learning to fit a model which is then used for estimating NPS scores for other users or for other time intervals. Since the KPIs are derived from protocol event data, the two algorithms may be combined to map NPS scores to protocol event data.

Also, if the NPS scores or estimated NPS scores based on the learned model indicates dissatisfied customers, the corresponding KPIs computed by the analytics system together with the possible causes as outlined herein may facilitate corrective actions. One example includes the launch of a new HD video application or ViLTE service by a network operator. After the launch of service, the operator may intend to identify the reasons for slow user adoption. The slow user adoption could be user demographics, application performance on some devices or application performance in certain regions. For characterizing the causes, the operator may send surveys to small sample of users. The survey results could then be used to train learning model, and the model used to estimate NPS scores for a larger set of users.

In another example, the system may be used to predict NPS scores of similarly situated users. For instance, a call made by particular user may suffer sub optimal performance, and that call may be run through the inference module 124 to identify most probable cause. Then, the inference module 124 may also predicted NPS score. If the NPS score fits certain criteria (e.g., is below a threshold or is associated with corrective action), then the inference module 124 may also search call records for similarly situated users, such as users who have experienced or may be expected to experience similar performance issues. In one example in which the most probable cause includes an eNodeB failure, then inference module 124 may search a database of call records for other users who often interact with that same eNodeB and then take appropriate action with respect to those different users. For instance, the network operator may then send an apology text message, send an explanatory text message an update on progress with addressing the issue, may provide the network users with complementary data, or the like.

Figure 2:
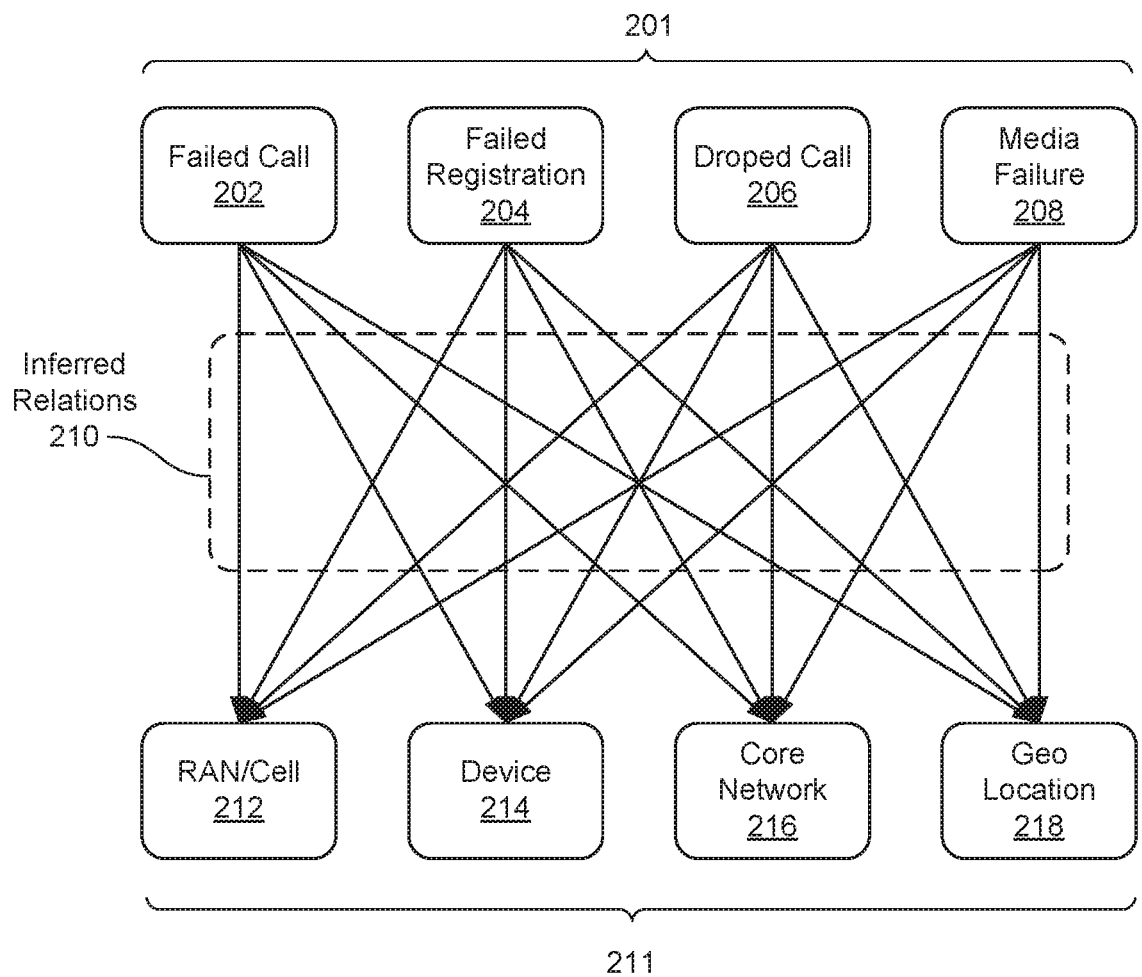
FIG. 2 is a diagram showing illustrating inference of relationships between KPIs and event parameters, according to one example of principles described herein.

FIG. 2 is a diagram showing inference of relationships between KPIs 201 and event parameters 211. The event parameters 211 include RAN/cell, device 214, core network 216, and geographic location 218. These event parameters may be associated with a particular event object. For example, an event object representing a particular call may specify which pieces of hardware within the RAN were involved (e.g., which enodeB/cell was connected wirelessly to a mobile device) and thus the geographic location of the call. The event object for the particular call may also specify the model and manufacturer of the mobile device. The event object for the particular call may also identify which pieces of hardware (e.g., servers), hardware types/versions, the corresponding hardware vendors within the core network were involved with the call. Such feature may facilitate comparing different vendor devices in relative to KPI anomalies, NPS Scores etc.

As also described above, the analytics module 122 may assign a KPI to a particular event object based on transactions from various protocols associated with the event object. The inference module is then used to infer relationships between the parameters 211 of the event object and the KPI assigned to it. FIG. 2 illustrates a number of "bad" KPIs, which include a failed call 202, a failed registration 204, a dropped call 206, and a media failure 208. Other KPIs are contemplated as well.

Figure 3:
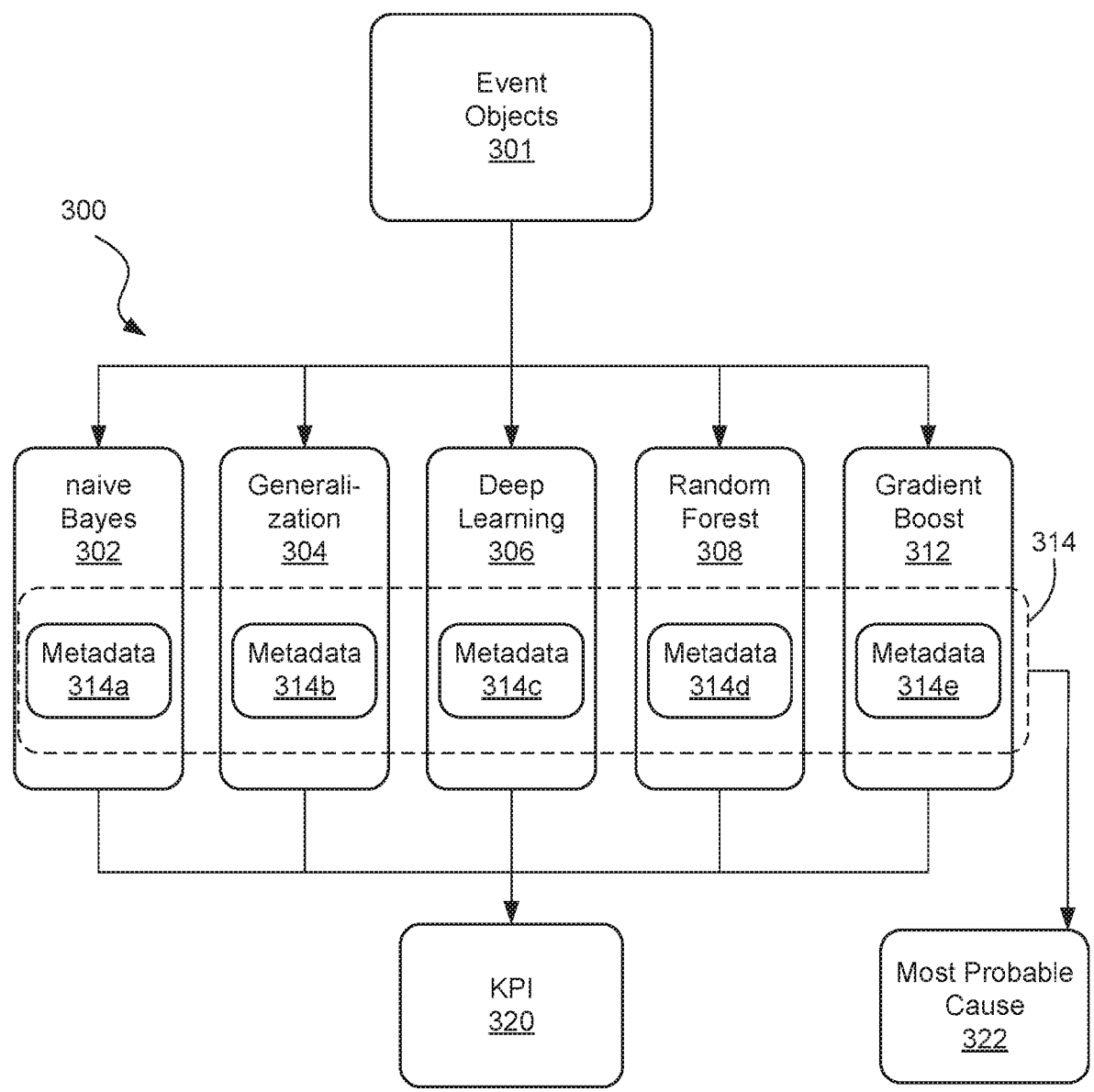
FIG. 3 is a diagram showing utilization of metadata from multiple inference functions to determine the most probable cause for a KPI, according to one example of principles described herein.

FIG. 3 is a diagram showing utilization of metadata from multiple inference functions to determine the most probable cause for a particular KPI. In the present example, a set of event objects 301 associated with the failed registration KPI are applied to various inference functions. Inference functions may include, for example, machine learning functions. Machine learning functions are used to create models that define the relationships between a set of inputs and a set of outputs. Thus, using the models created by such machine learning functions, one can predict that with a certain set of inputs, a certain set of outputs will result. However, predicting the output does not necessarily identify which of the inputs is driving the outputs.

According to principles described herein, a set of event objects for a particular KPI are applied to multiple different inference functions. For example, the event objects 301 may be applied to a naïve Bayes function 302, a generalization function 304, a deep learning function 306, a random forest 308 function, and a gradient boost function 312. In some examples, the event objects 301 may be applied to two or more inference functions. Other types of inference functions may be used as well.

Each of the inference functions 300 may produce metadata 314. For example, the naïve Bayes function 302 may produce metadata 314a, the generalization function 304 may produce metadata 314b, the deep learning function 306 may produce metadata 314c, the random forest function 308 may produce metadata 314d, and the gradient boost function 312 may produce metadata 316. Using this metadata 314, the analytics platform may determine which of the input parameters is driving the output. The input parameter(s) driving the decision towards the KPI 320 may be deemed the most probable cause 322 for the KPI.

As an example, a network operator may wish to know why failed registrations are occurring. Thus, the analytics platform may collect a certain number of event objects that have been associated with a failed registration. Each of these objects may be passed through the multiple inference functions. The metadata 314 from those inference functions may then be used to determine that a particular device model drives a particular KPI. It may then be determined that the particular device is the most probable cause for the KPI. In another example, it may be determined that a particular enodeB is driving the KPI. Thus, the network operator may investigate that enodeB further to determine a solution to the problem.

In some examples, to further reduce the amount of data to be processed, for a particular KPI, the analytics platform may take only the top subset of data for a particular input parameter. For example, for the device parameter and the failed registration KPI, data for only the top n devices associated with a failed registration may be used. For example, it may be determined that device A is associated with 30,000 failed registrations, device B is associated with 25,000 failed registrations, and device C is associated with 500 failed registrations. In such case, the inference module may use only event objects associated with device A and device B while not using event objects associated with device C. In much larger data sets, the inference module may use the top 15 devices types out of 150 different device types associated with the failed registration KPI. Other parameters may also use this type of data reduction. For example, event objects associated with the top 10 enodeBs for the RAN parameter may be used.

Figure 4:
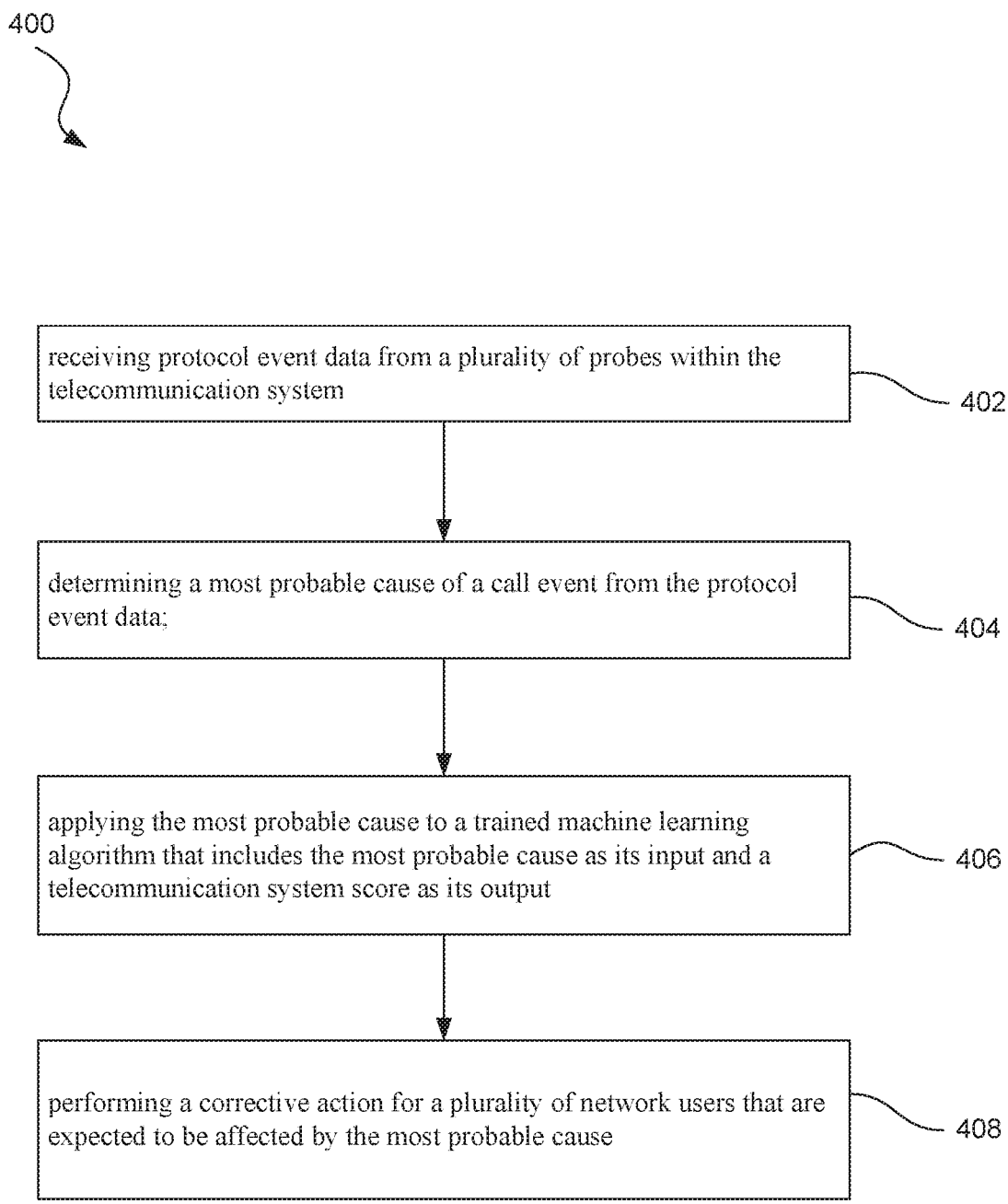
FIG. 4 is a flowchart showing an illustrative method for determining the most probable cause of a KPI of a telecommunication system, according to one example of principles described herein.

FIG. 4 is a flowchart showing an illustrative method 400 for performing predictive scoring of a telecommunication system. In some examples, method 400 may be performed by an analytics platform (e.g., platform 101 of FIG. 1) and more specifically by an inference module within an analytics platform. Put another way, one or more processors may execute the machine-readable code, which causes those processors to provide the functionality of method 400.

At action 402, the system receives protocol event data from a plurality of probes within a telecommunication system. For instance, the probes may replicate data packets and send those data packets to analytics platform 101. The analytics platform may then parse the received information to understand the packets at each protocol layer. In some examples, the probes may collect data that is being transmitted between a RAN and MME or between a RAN and a SGW. However, probes may be placed anywhere within the telecommunication system, even within a UE, an eNodeB, or elsewhere.

At action 404, the system determines the most probable cause of a call event from the protocol event data. Examples of call events include any type of negative event that may or may not be noticed by a user, including a KPI or anomaly or degradation. For instance, the protocol event data may include data relating to a multitude of different protocol processes for a variety of different protocols from call set up through call termination and including data exchange during the call. Examples of determining the most probable cause are discussed herein with respect to FIGS. 2 and 3 above. For instance, in some instances protocol event data may be fed into a trained machine learning algorithm, which outputs KPI data. The system may then examine the metadata of the trained machine learning algorithm to determine which parameters indicate a most probable cause.

At action 406, the system applies the most probable cause to a trained machine learning algorithm that includes most probable cause as its input and a telecommunication score as its output. Additionally, or alternatively, the machine learning algorithm may receive a computed KPI as its input from which it computes its output. For example, the system may receive the protocol event data and calculate a multi-protocol KPI by comparing protocol cause codes and reason codes for multiple protocols across multiple stages of the call to a pre-programmed table of protocol causes. The computed KPI may indicate a plurality of different cause codes in a plurality of different protocols. Examples are provided in U.S. Prov. Pat. App. 62/763,969. Of course, this example assumes that the machine learning algorithm has been trained using the computed KPI and historic telecommunication scores.

An example of a telecommunication score includes a NPS score, although the scope of embodiments may use any appropriate scoring system that indicates how a network user may feel about the service she receives from the telecommunication network.

The machine learning algorithm may be trained by providing historic NPS survey data coupled with historic network event data that is associated with the users who provided the historic NPS survey data. As the system is trained, it is expected to output a NPS score based on the received network event data that corresponds with what would have been expected from actual survey data based on the same network events.

In this example, the telecommunication system has at its disposal network call records that link users, network events (e.g., suboptimal services and their causes), and survey data. The analytics platform uses these call records to train the machine learning algorithm.

Since there may be multiple protocol event records for a service such as VoLTE/ViLTE, and in large mobile network there would be millions of calls, and even larger volume of event records, the machine algorithms may use the data reduction methods as identified in U.S. Prov. Pat. App. 62/763,969.

Figure 6:
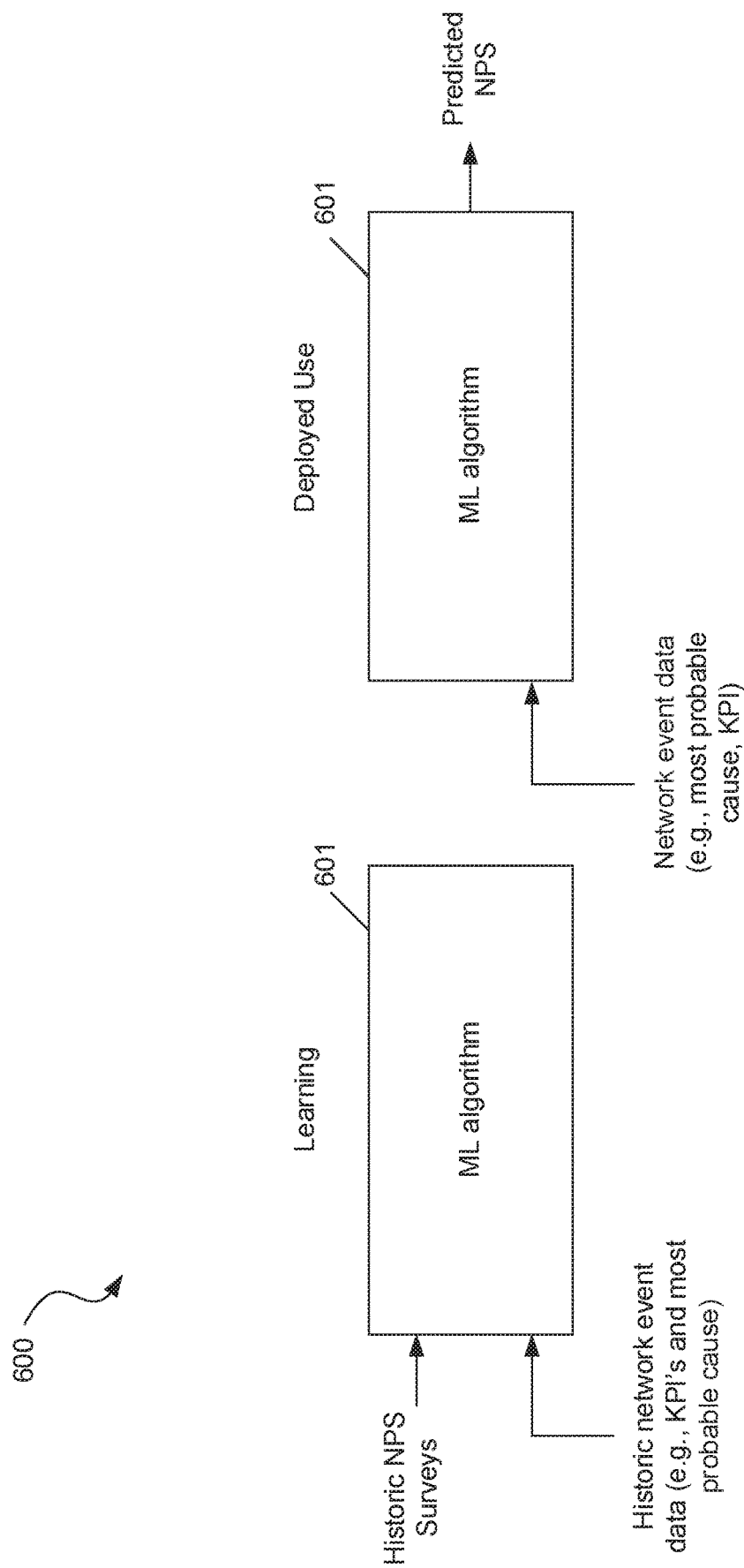
FIG. 6 is an illustration of an example process, showing a machine learning algorithm during a learning stage and a deployed use stage, according to one embodiment.

Moving to FIG. 6, it illustrates an example process that include both learning and deployed use. FIG. 6 is offered for greater context around the method 400 of FIG. 4.

During the learning stage, the machine learning algorithm 601 receives as input historical NPS surveys as well as historic network event data corresponding to that survey data. Examples of historic network event data may include most probable cause and KPI, though the scope of embodiments is not limited just to that. In fact, other embodiments may input protocol event data as well. The machine learning algorithm 601 is trained to associate the historic network event data to the historic NPS surveys.

The algorithm 601 may use hierarchical learning and classification, by first computing call/service KPIs, then summarizing KPI of each user within an observation interval, selecting the time interval that is prior to the operator survey that serves as the labeled dataset with NPS scores, and then running learning algorithm to KPI densities to NPS scores.

During the deployed use stage, that trained machine learning algorithm 601 receives as its input network event data. The machine learning algorithm then outputs predicted NPS scores based on the network event data.

The trained machine learning algorithm 601 predicts subsequent NPS scores for a broader set of users at different time periods. Running the algorithm 601 in near-real-time fashion close to the arrival of event records, using the virtual call emulation and rules table methods identified in U.S. Prov. Pat. App. 62/763,969, may facilitate faster estimation of NPS Scores, and detect trending of degradation in different dimensions (Sector, Cell Site, mobile Device Type, transit network device type etc.) for timely action by the operator.

Returning to FIG. 4, at action 408, the system performs a corrective action for a plurality of network users that are expected to be affected by the most probable cause. Once again, in this example the system has at its disposal network call records that link users, network events, and survey data. Once a most probable cause has been identified, that most probable cause may be used as a key to search through the call records to identify a plurality of network users who are similarly situated to the user whose call was employed to determine the most probable cause. For instance, if the call is analyzed to determine a particular UE handset model failing to register is the most probable cause, then the analytics platform may search its call records to identify a plurality of users who are known to use that handset model. The system may then take any appropriate action.

Corrective actions may include any of a variety of actions that may take into account network user satisfaction, make changes to the network or UEs, and the like. Examples may include sending a short message service (SMS) message to the plurality of network users to apprise them of the most probable cause. For example, an SMS message may tell a plurality of network users, "Your handset model is not supported by the operator, or the use requires upgrading the mobile device to SW Version 10.3 or later." Similarly, another corrective action may include providing the plurality of network users with discounted use of the telecommunication system, such as by reducing a monthly bill or by providing additional data to the user's plan. Thus, the corrective action may include techniques to compensate user for inconvenience. Another example includes notifying technicians to modify or repair a piece of infrastructure that may be failing. Corrective actions may include customer follow-up after repeated call problems, discounts/promotions after high number of problem calls, or any other action that may be expected to change or increase user satisfaction.

The scope of embodiments is not limited to the particular series of actions shown in FIG. 4. Rather, other embodiments may add, omit, modify, rearrange one or more actions of method 400. For instance, it is expected that method 400 may be performed for a multitude of calls throughout operation of the telecommunication system and may be performed regularly for problematic calls. Furthermore, actions 404 and 408 may include human intervention to assist in determining the most probable cause from the machine learning algorithm or to approve corrective action.

Figure 5:
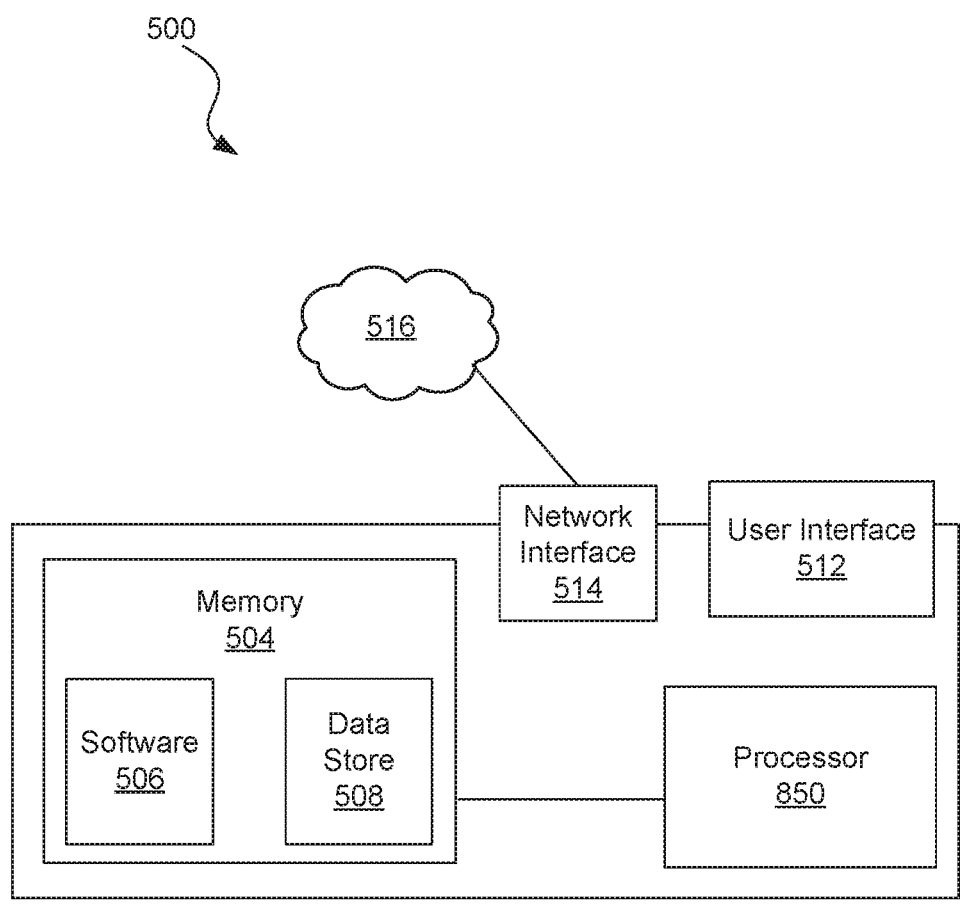
FIG. 5 is a diagram showing an illustrative computing system that may be used to perform the functions related to event object classification described herein.

FIG. 5 is a diagram showing an illustrative computing system that may be used to perform the functions related to event object classification described herein, such as the functions described above in the text accompanying FIGS. 1-4. In other words, the computing system 500 may be used to perform the functions associated with the analytics platform 101. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. The software 506 may be, for example, software designed to provide a web communication feature creation service. In such case, the computing system 500 may be associated with the web communication service. In some examples, the computing system 500 may be associated with a user. In such case, the software 506 may be an application to render web content, such as a browser. The software 506 may include machine readable instructions of a computer program product that when executed, perform the functions described above in accordance with the text accompanying FIG. 4.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system that collects information in a telecommunication system, the method comprising:
    receiving protocol event data from a plurality of probes within the telecommunication system;
    determining a most probable cause of a network failure from the protocol event data;
    training a machine learning algorithm by inputting historic net promoter score surveys and most probable cause data, thereby generating a trained machine learning algorithm that relates most probable causes of network failures to expected net promoter scores;
    applying the most probable cause to the trained machine learning algorithm, which receives the most probable cause as input and provides a net promoter score as output based on the most probable cause; and
    in response to the output net promoter score from the trained machine learning algorithm, performing a corrective action for a plurality of network users that are expected to correspond to the output net promoter score, the corrective action including using the most probable cause as a key to search through call records to identify the plurality of network users, and sending a message to the plurality of network users to apprise them of the most probable cause.

2. The method of claim 1, further comprising sending a survey to a subset of the plurality of network users and verifying the output net promoter score using returned survey results.

3. The method of claim 1, further comprising sending a survey to a subset of the plurality of network users and tuning the trained machine learning algorithm using returned survey results.

4. The method of claim 1, wherein the trained machine learning algorithm includes an item selected from the list consisting of:
    Naïve Bayes;
    Deep Learning;
    Random Forest; and
    Gradient Boost.

5. The method of claim 1, wherein the probes collect data being transmitted between a Radio Access Network (RAN) and a Mobility Management Element (MME).

6. The method of claim 1, wherein the probes collect data being transmitted between a Radio Access Network (RAN) and a Serving Gateway (SGW).

7. The method of claim 1, wherein the network failure is associated with a call event that includes a Key Performance Indicator (KPI) associated with call failure, an anomaly, or call degradation.

8. The method of claim 1, wherein performing the corrective action for the plurality of network users also comprises an item selected from the list consisting of:
    providing the plurality of network users with discounted use of the telecommunication system; and
    providing the plurality of network users with additional data use within the telecommunication system.

9. A system comprising:
    a processor; and
    a memory having machine readable instructions that when executed by the processor, cause the system to:
    receive protocol event data from a plurality of probes within a telecommunication system;
    determine a most probable cause of a network failure from the protocol event data;
    train a machine learning algorithm by inputting historic net promoter score surveys and most probable cause data, thereby generating a trained machine learning algorithm that relates most probable causes of network failures to expected net promoter scores;
    apply the most probable cause to the trained machine learning algorithm, which receives the most probable cause as input and provides a net promoter score as output based on the most probable cause; and
    in response to the output net promoter score from the trained machine learning algorithm, perform a corrective action for a plurality of network users that are expected to correspond to the output net promoter score, the corrective action including using the most probable cause as a key to search through call records to identify the plurality of network users, and sending a message to the plurality of network users to apprise them of the most probable cause.

10. The system of claim 9, further comprising instructions to cause the system to send a survey to a subset of the plurality of network users and verifying the output net promoter score using returned survey results.

11. The system of claim 9, further comprising instructions to cause the system to send a survey to a subset of the plurality of network users and tuning the trained machine learning algorithm using returned survey results.

12. The system of claim 9, wherein the trained machine learning algorithm includes an item selected from the list consisting of:
    Naïve Bayes;
    Deep Learning;
    Random Forest; and
    Gradient Boost.

13. The system of claim 9, wherein the probes collect data transmitted between a Radio Access Network (RAN) and a Mobility Management Element (MME).

14. The system of claim 9, wherein the probes collect data transmitted between a Radio Access Network (RAN) and a Serving Gateway (SGW).

15. The system of claim 9, wherein the network failure is associated with a call event that includes a Key Performance Indicator (KPI) associated with call failure, an anomaly, or call degradation.

16. The system of claim 9, wherein the message is a short message service (SMS) message.

17. The system of claim 16, wherein the SMS message also indicates an action to take.

18. The method of claim 1, wherein the message is a short message service (SMS) message.

19. The method of claim 18, wherein the SMS message also indicates an action to take.

\* \* \* \* \*